United States Patent
Alston et al.

(10) Patent No.: US 8,164,443 B2
(45) Date of Patent: *Apr. 24, 2012

(54) GROUP AWARE TRACKING OF PERSONAL PROPERTY WITHIN A BOUNDED ZONE

(75) Inventors: Marya L. Alston, Wake Forest, NC (US); Joel Duquene, Raleigh, NC (US); Morris S. Johnson, Jr., Cary, NC (US); Henri F. Meli, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 459 days.

This patent is subject to a terminal disclaimer.

(21) Appl. No.: 12/420,652

(22) Filed: Apr. 8, 2009

(65) Prior Publication Data
US 2010/0259385 A1   Oct. 14, 2010

(51) Int. Cl.
*G08B 1/08* (2006.01)
(52) U.S. Cl. ......... 340/539.13; 340/539.15; 340/539.23; 340/573.1; 340/825.49
(58) Field of Classification Search .............. 340/539.15, 340/539.13, 539.23, 572.1, 572.4, 573.1, 340/568.1, 825.49, 824.49
See application file for complete search history.

(56) References Cited

U.S. PATENT DOCUMENTS

| | | | |
|---|---|---|---|
| 7,164,354 B1 * | 1/2007 | Panzer | 340/539.15 |
| 7,535,353 B2 * | 5/2009 | Hirai et al. | 340/541 |
| 2007/0262862 A1 * | 11/2007 | Barrett et al. | 340/539.15 |

* cited by examiner

*Primary Examiner* — Hung T. Nguyen
(74) *Attorney, Agent, or Firm* — Steven M. Greenberg, Esq.; Carey, Rodriquez, Greenberg & O'Keefe

(57) ABSTRACT

Embodiments of the present invention address deficiencies of the art in respect to personal articles tracking and provide a method, system and computer program product for group aware tracking within a bounded zone. In an embodiment of the invention, a group aware tracking method can include recording an association in a table in a computing system between individuals within a geographically bounded zone and at least one target object within the geographically bounded zone. The method also can include sensing an individual from amongst the individuals exiting the geographically bounded zone and further sensing a target object exiting the geographically bounded zone. The method yet further can include comparing the sensed individual with the further sensed target object to determine whether or not an association exists in the table and triggering an alarm when an association is determined not to exist in the table between the sensed individual and the further sensed target object.

11 Claims, 2 Drawing Sheets

GROUP AWARE TRACKING OF PERSONAL PROPERTY WITHIN A BOUNDED ZONE

BACKGROUND OF THE INVENTION

1. Field of the Invention

The present invention relates to the field of article remote sensing and tracking and more particularly to article sensing and tracking within a bounded zone.

2. Description of the Related Art

The personal wealth created by the post-modern economic order has resulted in an explosion of personal articles possession by individual consumers. Articles ranging from cellular telephones to handheld computers now burden the ordinary consumer in tracking the whereabouts of any given article at any given time. Tracking articles in a controlled environment such as one's home can be manageable in that a sense of urgency in locating a particular article can be minimized. However, in a remote environment such as a public facility, the sense of urgency in locating a particular article can border the chaotic.

Public facilities—especially retail stores—have invested substantial resources in combating the loss of store inventory through personal articles tracking. For many years, security tags affixed to articles have formed the basis of loss prevention in the retail setting. The advent of radio frequency identification (RFID) technology has enabled personal articles tracking to expand from the loss prevention use case to more sophisticated use cases including inventory tracking and lost article location. Indeed, RFID technologies have been proposed for use in locating personal articles when misplaced or forgotten in a public facility such as a shopping mall, performance arena, and the like.

For example, in U.S. Pat. No. 7,271,715 to Aupperle et al. for Personal Articles Tracking, RFID tags, including conventional inventory type RFID tags, can be affixed to personal articles that are to be tracked. A tracking processor can sense the presence of the RFID tags and can register the corresponding personal articles in a registry or inventory of tracked personal articles. Once an inventory of tracked personal articles has been established, the tracking processor can actively monitor the presence of each tracked personal article to ensure the proximity of the same. When any one tracked personal article falls outside of a threshold sensing range of the tracking processor, an alert can be issued so as to prevent the loss or theft of the personal article that has fallen outside of the threshold range.

Even still, it will be understood that personal articles can be appropriately associated with more than one person. For instance, a cell phone can be permissibly associated with multiple different family members. As such, a false alert will be generated when the cell phone transfers possession from one family member to another. Likewise, in tracking a person, such as a child on a school field trip, the close proximity of the child to any one of a number of chaperones will be permissible, and as such, linking the child to a specific chaperone can be too rigid a rule. Also, tracking a personal article based only upon strict proximity to a person does not address the reality that in many cases, it is acceptable to leave a personal article in a trusted zone, but apart from the person, for instance within an office in a building or in an area of an outdoor space like a park. Thus, proximity between an individual and a tracked article alone is not a true indicator of whether or not the tracked article has been lost or misappropriated.

BRIEF SUMMARY OF THE INVENTION

Embodiments of the present invention address deficiencies of the art in respect to personal articles tracking and provide a novel and non-obvious method, system and computer program product for group aware tracking within a bounded zone. In an embodiment of the invention, a group aware tracking method can include recording an association in a table in a computing system between individuals within a geographically bounded zone and at least one target object within the geographically bounded zone. The method also can include sensing an individual from amongst the individuals exiting the geographically bounded zone and further sensing a target object exiting the geographically bounded zone. The method yet further can include comparing the sensed individual with the further sensed target object to determine whether or not an association exists in the table and triggering an alarm when an association is determined not to exist in the table between the sensed individual and the further sensed target object.

In another embodiment of the invention, a group aware tracking data processing system can be provided. The system can include a computer system including memory, at least one processor and fixed storage. The system further can include a link table coupled to the computer system, such that the table includes associations between individuals and target objects in at least one geographically bounded zone. The system even further can include each of a personal identification sensor disposed in proximity to a boundary of the geographically bound zone and coupled to the computer system, and also a target object sensor disposed in proximity to the boundary and coupled to the computer system.

Finally, the system can include group aware tracking logic executing in the computer system. The logic can include program code of instructions enabled to compare an individual sensed exiting the geographically bounded zone by the personal identification sensor with a target object sensed exiting the geographically bounded zone by the target object sensor to determine whether or not an association exists in the link table and to trigger an alarm when an association is determined not to exist in the link table between the individual and the target object. In one aspect of the embodiment, the personal identification sensor can include a biometric sensor. In another aspect of the embodiment the target object sensor can include an RFID sensor.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for group aware tracking within a bounded zone. In accordance with an embodiment of the present invention, a bounded zone can be established. A target such as a personal item or person can be tagged for tracking within the bounded zone and the target can be associated with multiple different individuals in an authorized group. Responsive to detecting the departure of the target from the bounded zone, it can be determined whether or not the target remains in proximity to any one of the individuals in the authorized group. If not an alarm can be triggered. Likewise, responsive to detecting the departure of a last remaining one of the individuals in the authorized group, it can be determined whether or not the target remains in the bounded zone. If so the alarm can trigger. In this way, the proximity of the target to at least one individual in the authorized group outside of the bounded zone can be assured, while the proximity of the target to the individuals within the bounded zone need not be assured so long as at least one individual in the authorized group remains within the bounded zone.

Figure 1:
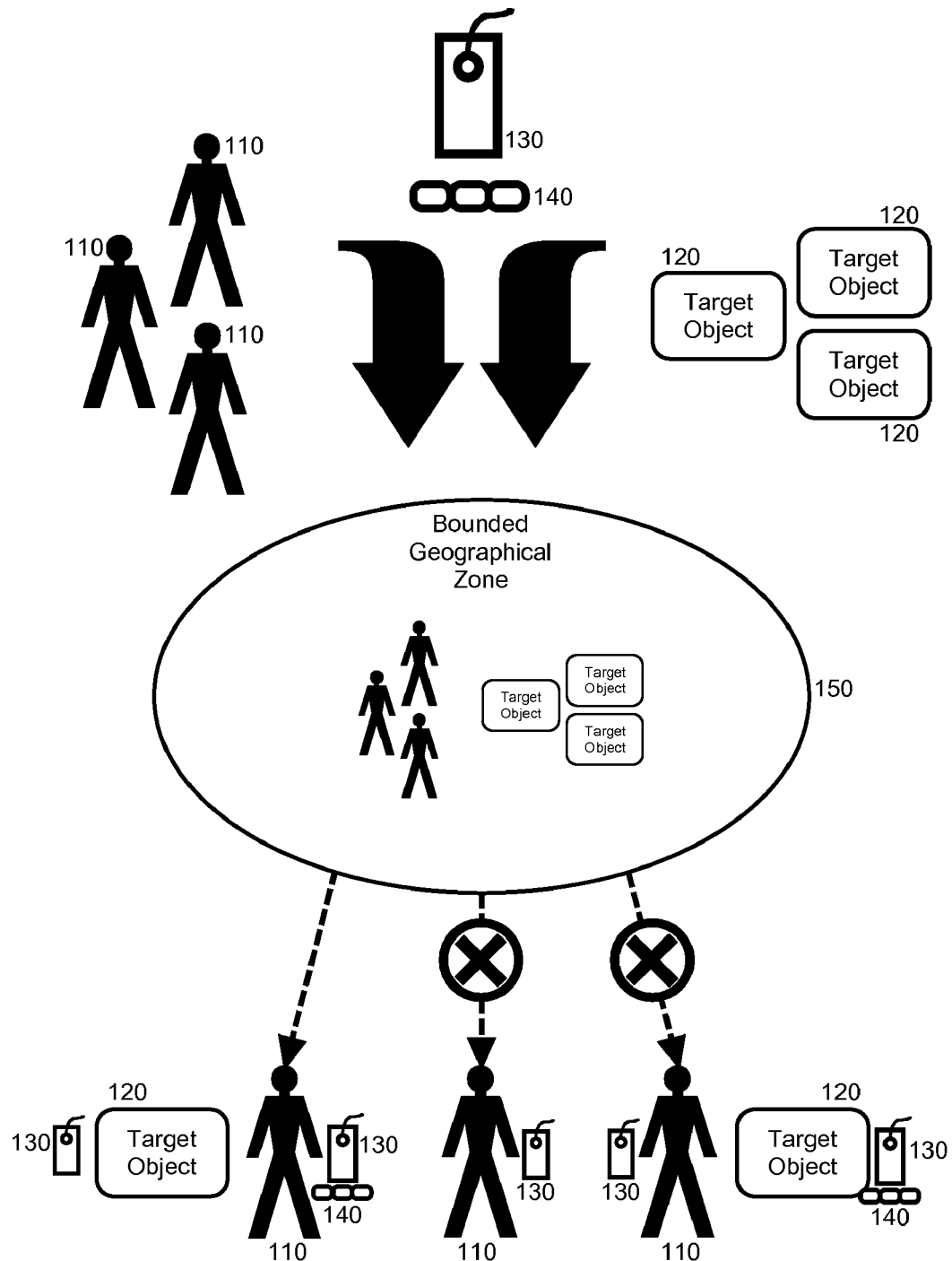
FIG. 1 is a pictorial illustration of a process for group aware tracking within a bounded zone.

FIG. 1 is a pictorial illustration of a process for group aware tracking within a bounded zone. Referring to FIG. 1, one or more individuals 110 can enter a geographically bounded zone 150 along with one or more target objects 120, for instance personal items or other individuals such as children. Each of the target objects 120 can be tagged with a sensor 130 such as an RFID tag or magnetic strip. Further, each of the individuals 110 can be identified upon entering the bounded zone 150, for instance by way of biometric sensing of a fingerprint, iris scan, credit card or drivers license scan, or pass code entry, to name a few examples.

Of note, upon entry into the geographically bounded zone 150, different ones of the individuals 110 can be grouped together as an "authorized group". Additionally, individual ones of the target objects 120 can be associated within the geographically bounded zone 150 with one or more of the individuals 110, or one or more authorized groups of the individuals 110 by way of a link 140 written to a record in a table of associations. Thereafter, as any of the individuals 110 within the geographically bounded zone 150, or as any of target objects 120 within the geographically bounded zone 150 exit the geographically bounded zone 150, it can be assured that each of the individuals 110 exiting the geographically bounded zone 150 exits only with associated ones of the target objects 120. Further, it can be assured that none of the target objects 120 within the geographically bounded zone 150 remain within the geographically bounded zone 150 once all associated ones of the individuals 110 have exited the geographically bounded zone 150.

Specifically, as shown as an example in FIG. 1, an exiting one of the individuals 110 leaving the geographically bounded zone 150 can be compared by a tag 130 of one or more of the target objects 120 also exiting the geographically bounded zone 150 to ensure that a link 140 exists associating the exiting one of the individuals 130 with the exiting one of the target objects 120. The comparison can occur by way of biometrically identifying the exiting one of the individuals 110 and sensing the tag 130 for the exiting one or the target objects 120. To the extent that a link 140 does not exist associating the exiting one of the individuals 110 with the exiting one of the target objects 120, an alarm can be triggered. Conversely, upon determining that none of the individuals 110 associated with one or more of the target objects 120 remaining in the geographically bounded zone 150 remains within the geographically bounded zone 150, an alarm also can be triggered.

Figure 2:
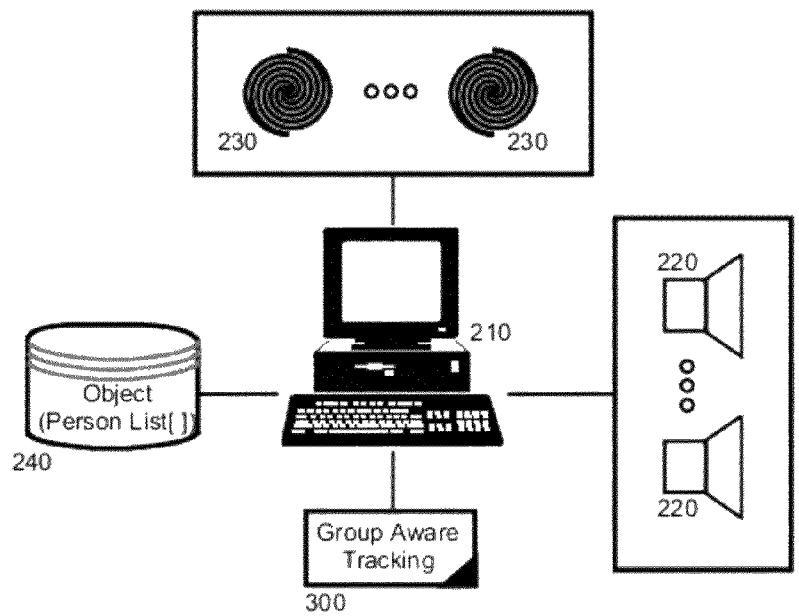
FIG. 2 is a schematic illustration of a data processing system configured for group aware tracking within a bounded zone; and, FIG. 3 is a flow chart illustrating a process for group aware tracking within a bounded zone.

The process described in connection with FIG. 1 can be implemented within a data processing system of one or more computing systems, each with one or more processors, memory and fixed storage. In illustration, FIG. 2 schematically depicts a data processing system configured for group aware tracking within a bounded zone. The system can include at least one computing system 210 with one or more processors, memory and fixed storage storing a link table 240 of associations between individuals and target objects. The link table 240, in this regard, can include links associating each individual with one or more target objects, or links associating an authorized group of individuals with one or more target objects.

The system further can include one or more biometric sensors 230 coupled to the computing system 210. The personal identification sensors 230 can include, by way of example, a card scanner configured to scan data from a magnetic strip of a personal identifying card such as a credit card, drivers license, identification card, or even a passport. Alternatively, the personal identification sensors 230 can include one or more biometric sensors configured to scan a fingerprint, or iris of an individual in order to identify the individual. As yet another alternative, the personal identification sensors 230 can include a pass code authorization system configured to accept a pass code personal to an individual in order to identify the individual.

The system yet further can include one or more target object sensors 220 each configured to sense a tag associated with a target object. The tag can be an RFID tag and as such, the target object sensors 220 can include RFID readers. Alternatively, each tag can be a loss prevention tag with a magnetically identifying strip and the target object sensors 220 can include a tag sensor configured to sense the presence of the magnetically identifying strip. Finally, the system can include group aware tracking logic 300 executing as program code of an arrangement of a set of instructions in the memory of the computing system 210 by the processor of the computing systems 210.

The program code can be enabled to identify individuals through the coupled personal identification sensors 230 as the individual enters a geographically bounded zone. Further, the program code can be enabled identify target objects through the target object sensors 220 to associate identified target objects with one or more identified individuals, or with respect to a grouping of individuals as an "authorized group" associated with a corresponding target object or target objects. Finally, the program code can be enabled to detect through the operation of the personal identification sensors 230 and the target object sensors 220 the exiting of either or both of individuals and target objects from the geographically bounded zone.

Of import, the program code can be enabled to compare an individual detected exiting the geographically bounded zone with one or more target objects both remaining in the geographically bounded zone, and also exiting along with the detected individual. The comparison can refer to the link table 240 to positively determine whether or not the exiting individual has attempted to exit the geographically bounded zone only with those of the target objects associated with the exiting individual, and further to positively determine whether or not any target objects remain within the geographically bounded zone in the absence of any associated individual all of whom have exited the geographically bounded zone, or whom have attempted to exit the geographically bounded zone.

It will be recognized by the skilled artisan that the embodiments of the invention are not limited to group aware tracking within a single geographically bounded zone. Rather, in alternative embodiments of the invention, multiple different geographically bounded zones can be monitored through different personal identification sensors and target object sensors. In particular, individuals can be grouped together in different authorized groups for different geographically bounded zones such that individuals can be permitted associations with different target objects in one geographically bounded zone, but not another. Further, different target objects can be permitted to reside in one geographically bounded zone in the absence of particular individuals, while the same target objects cannot be permitted to reside in a different geographically bounded zone without the presence of at least one associated individual within the different geographically bounded zone.

Figure 3:
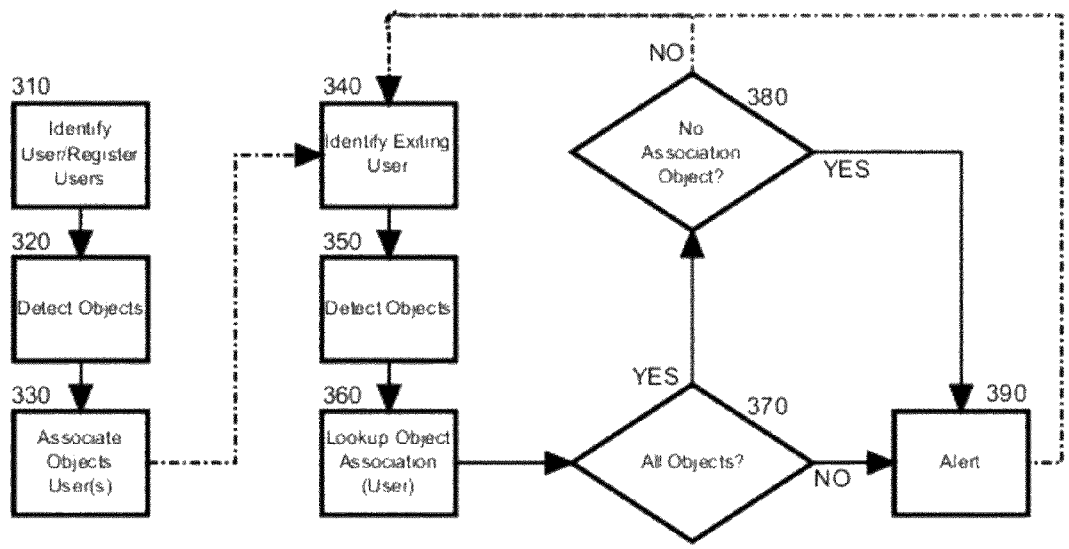

In yet further illustration of the operation of the group aware tracking logic 300, FIG. 3 is a flow chart illustrating a process for group aware tracking within a bounded zone. Beginning in block 310, an individual can be identifying upon entry into a geographically bounded zone. In block 320, one or more target objects can be detected entering the geographically bounded zone. In block 330, identified individuals entering the target zone can be associated with a corresponding identified target object or objects, and optionally, selected ones of the identified individuals can be grouped together into one or more authorized groups and one or more of the target objects can be associated with one or more of the authorized groups.

Thereafter, in block 340, an individual exiting from the geographically bounded zone can be detected and identified. In block 350, any target objects exiting the geographically bounded zone also can be detected. In block 360, an association between an exiting individual, an exiting target object, or both can be determined. Subsequently, in decision block 370 it can be determined whether or not all target objects exiting the geographically bounded zone in connection with an exiting individual have been associated with the exiting individual or an authorized group for which the exiting individual belongs. If not, an alert can be triggered in block 390 such as an audible or visible alarm. Otherwise, in decision block 380 it further can be determined whether or not a target object not detected to have exited the geographically bounded zone enjoys an association with at least one individual remaining within the geographically bounded zone (or authorized group with at least one individual remaining within the geographically bounded zone). If not, in block 390 an alert can be triggered. Otherwise, the process can repeat through block 340.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A group aware tracking method comprising:
   recording an association in a table in a computing system between a plurality of individuals within a geographically bounded zone and at least one target object within the geographically bounded zone;
   sensing an individual from amongst the individuals exiting the geographically bounded zone;
   further sensing a target object exiting the geographically bounded zone;
   comparing the sensed individual with the further sensed target object by a controller to determine whether or not an association exists in the table; and
   triggering an alarm when an association is determined not to exist in the table between the sensed individual and the further sensed target object.

2. The method of claim 1, further comprising:
   further determining whether or not a target object remaining in the geographically bound zone is associated in the table with an individual remaining in the geographically bound zone; and
   triggering an alarm when it is further determined that a target object remaining in the geographically bound zone is associated in the table only with individuals no longer remaining in the geographically bound zone.

3. The method of claim 1, wherein recording an association in a table in a computing system between a plurality of individuals within a geographically bounded zone and at least one target object within the geographically bounded zone, comprises:
   recording an association in a table in a computing system between an authorized group of a plurality of individuals within a geographically bounded zone and at least one target object within the geographically bounded zone; and
   wherein triggering an alarm when an association is determined not to exist in the table between the sensed individual and the further sensed target object, comprises:

triggering an alarm when an association is determined not to exist in the table between an authorized group including the sensed individual and the further sensed target object.

4. A group aware tracking data processing system comprising:
- a computer system comprising memory, at least one process and fixed storage;
- a link table coupled to the computer system, the table comprising associations between individuals and target objects in at least one geographically bounded zone;
- a personal identification sensor disposed in proximity to a boundary of the geographically bound zone and coupled to the computer system;
- a target object sensor disposed in proximity to the boundary and coupled to the computer system; and
- group aware tracking logic executing in the computer system, the logic comprising program code of instructions enabled to compare an individual sensed exiting the geographically bounded zone by the personal identification sensor with a target object sensed exiting the geographically bounded zone by the target object sensor to determine whether or not an association exists in the link table and to trigger an alarm when an association is determined not to exist in the link table between the individual and the target object.

5. The system of claim 4, wherein the personal identification sensor comprises a biometric sensor.

6. The system of claim 4, wherein the target object sensor comprises a radio frequency identification (RFID) sensor.

7. The system of claim 4, further comprising additional personal identification sensors and target object sensors disposed about different geographically bounded zones, and wherein the link table comprises different associations for a target object with different individuals corresponding to different geographically bounded zones.

8. The system of claim 4, wherein the link table further comprises associations between an authorized group of individuals and a target object.

9. A computer program product comprising a computer usable storage medium embodying computer usable program code for group aware tracking, the computer program product comprising:
- computer usable program code for recording an association in a table in a computing system between a plurality of individuals within a geographically bounded zone and at least one target object within the geographically bounded zone;
- computer usable program code for sensing an individual from amongst the individuals exiting the geographically bounded zone;
- computer usable program code for further sensing a target object exiting the geographically bounded zone;
- computer usable program code for comparing the sensed individual with the further sensed target object to determine whether or not an association exists in the table; and
- computer usable program code for triggering an alarm when an association is determined not to exist in the table between the sensed individual and the further sensed target object which are processed by a controller.

10. The computer program product of claim 9, further comprising:
- computer usable program code for further determining whether or not a target object remaining in the geographically bound zone is associated in the table with an individual remaining in the geographically bound zone; and
- computer usable program code for triggering an alarm when it is further determined that a target object remaining in the geographically bound zone is associated in the table only with individuals no longer remaining in the geographically bound zone.

11. The computer program product of claim 9,
wherein the computer usable program code for recording an association in a table in a computing system between a plurality of individuals within a geographically bounded zone and at least one target object within the geographically bounded zone comprises, recording an association in a table in a computing system between an authorized group of a plurality of individuals within a geographically bounded zone and at least one target object within the geographically bounded zone; and
wherein the computer usable program code for triggering an alarm when an association is determined not to exist in the table between the sensed individual and the further sensed target object comprises, computer usable program code for triggering an alarm when an association is determined not to exist in the table between an authorized group including the sensed individual and the further sensed target object.

* * * * *

UNITED STATES PATENT AND TRADEMARK OFFICE
CERTIFICATE OF CORRECTION

PATENT NO. : 8,164,443 B2  
APPLICATION NO. : 12/420652  
DATED : April 24, 2012  
INVENTOR(S) : Marya L. Alston et al.

Page 1 of 1

It is certified that error appears in the above-identified patent and that said Letters Patent is hereby corrected as shown below:

On the Title Page

Item (*) Notice regarding Terminal Disclaimer Information is deleted.

Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*